July 15, 1952     A. L. ADAMS     2,603,366
TRUCK UNLOADING APPARATUS
Filed March 2, 1948     2 SHEETS—SHEET 1
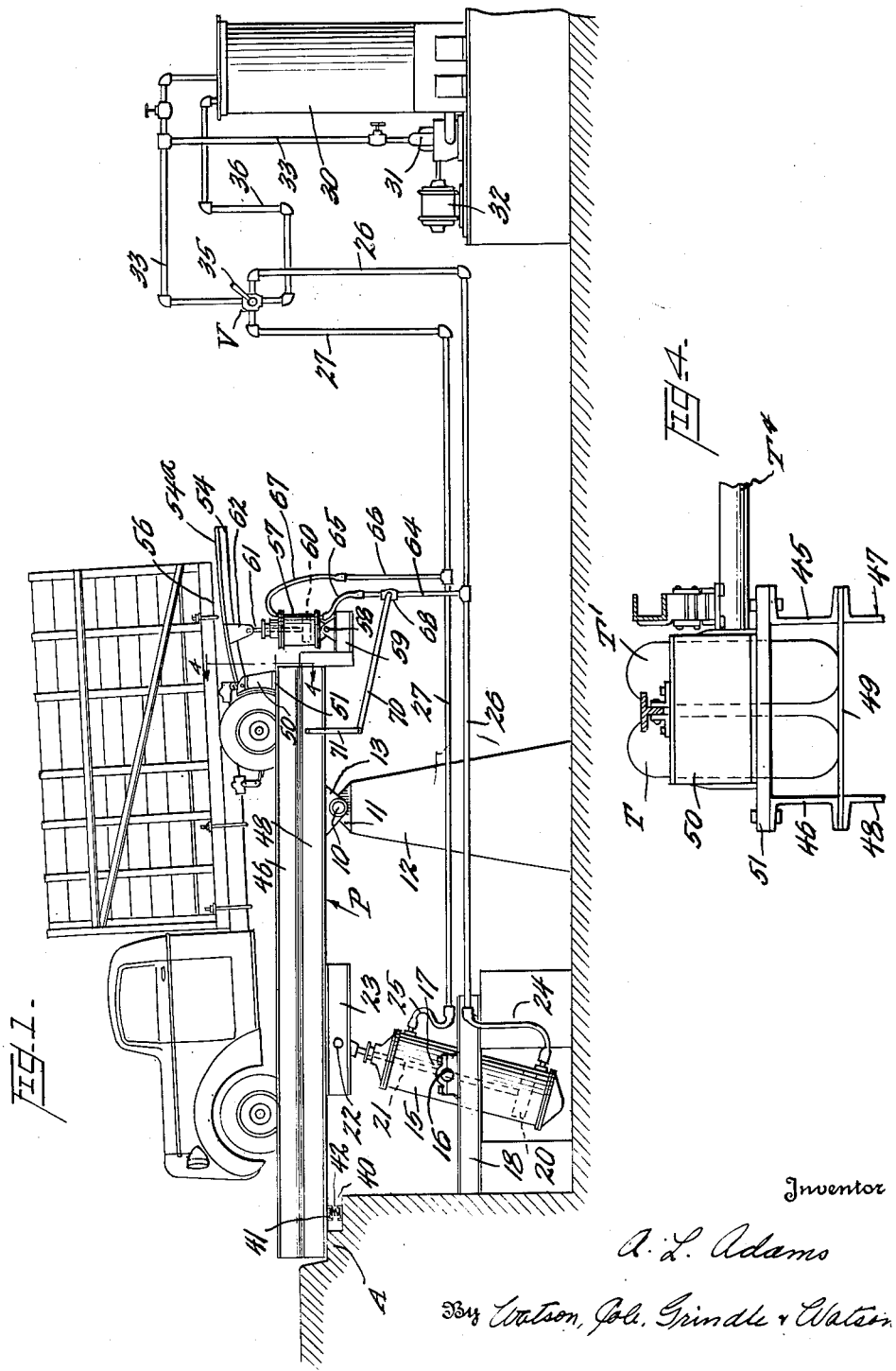
Inventor
A. L. Adams
By Watson, Cole, Grindle & Watson
Attorneys

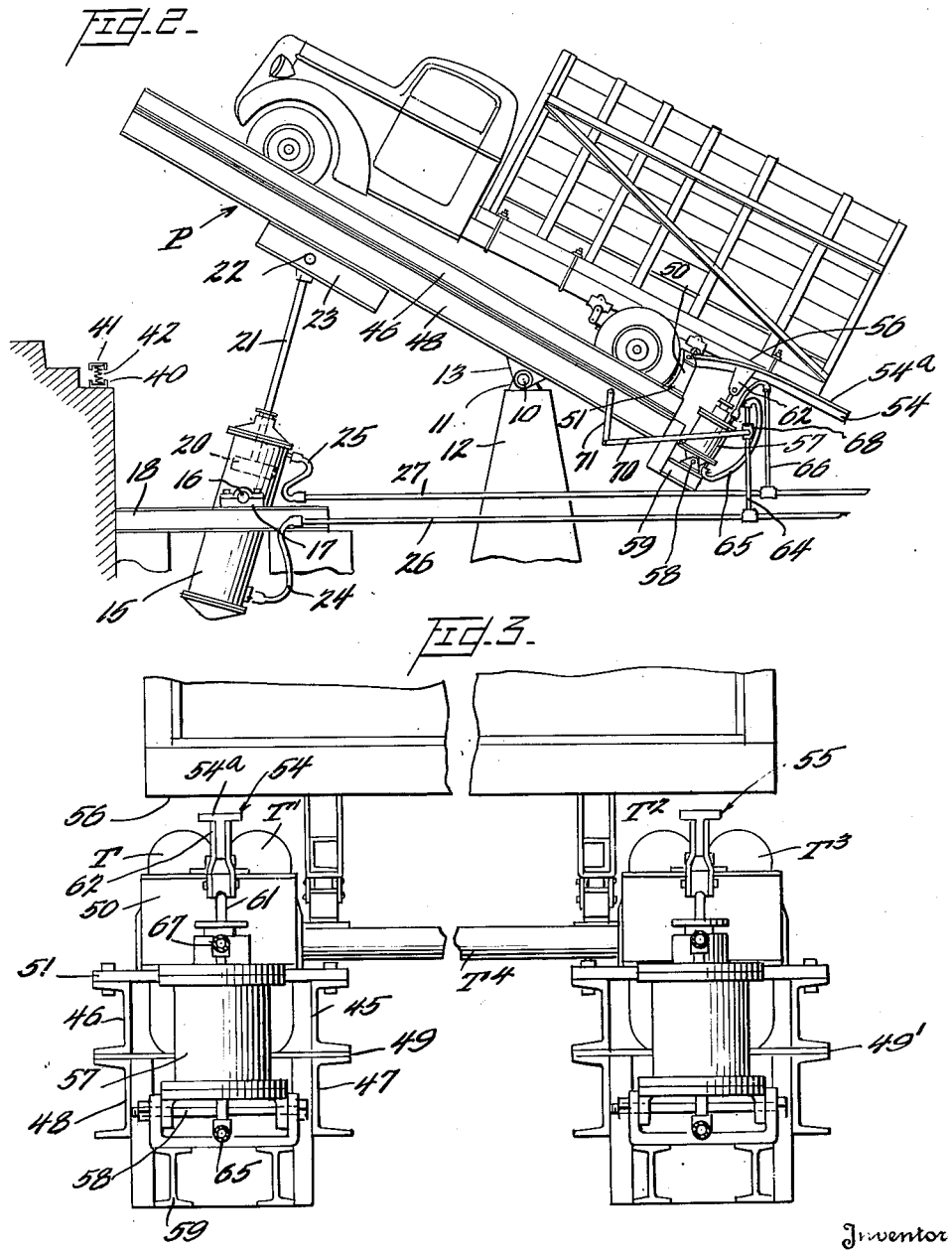

Patented July 15, 1952

2,603,366

UNITED STATES PATENT OFFICE 2,603,366

TRUCK UNLOADING APPARATUS

Arthur Linwood Adams, Ensenada, P. R.

Application March 2, 1948, Serial No. 12,602

4 Claims. (Cl. 214—49)

The present invention relates to cargo vehicle unloading apparatus, particularly to means for unloading such a vehicle by tilting it until the floor of its cargo space reaches such an angle that any goods or materials resting thereon will slide from the cargo space of the vehicle body and fall downwardly into a bin or onto a conveyor for removal to a distant point.

Various types of apparatus for tilting cargo carrying vehicles such as trucks and railroad cars have heretofore been designed and certain mechanisms of this character have been placed in use, such for instance as those utilized for the purpose of effecting the discharge of ore and grain from railroad freight cars and for tilting road vehicles such as trucks in order to most quickly effect the discharge of the coal, grain, gravel or other unpackaged or packaged cargo. The present mechanism is of general applicability but is particularly helpful when incorporated in apparatus for the unloading of road vehicles.

One embodiment of the invention which has been designed particularly for use in the unloading of motor vehicles will be disclosed by way of example. This apparatus embodies, in association with a platform mounted for tilting movement about a horizontal axis, means for engaging and steadying the vehicle body during the tilting operation. All motor vehicles of the cargo type are provided with springs intermediate the axles and vehicle body and the springs are often unduly strained during unloading operations, the load sliding over the floor of the vehicle toward its rear end and, when heavy, causing too great a concentration of load at the extreme rear end of the vehicle body and promoting excessive spring deformation. Furthermore, as the center of gravity moves rearwardly during such a discharging operation it reaches a point well in rear of the rear axle so that, if the load is a heavy one, the weight of the entire forward portion of the vehicle may be overbalanced and this forward portion will be lifted, tilting about the rear axle as an axis, the front wheels of the vehicle being raised from the platform and falling to the platform after the load has been discharged, to the injury of the vehicle as a whole.

In order to prevent the overloading and distortion of the rear springs of a cargo vehicle undergoing unloading by tilting, and for the further purpose of preventing tilting movement of the vehicle as a whole about a horizontal axis as the center of gravity of the load slides over the floor of the cargo space, I provide means associated with the platform for engaging and supporting the vehicle body during such a tilting operation. This means includes elements movable relatively to the platform and into engagement with the vehicle body, power being preferably employed to effect such movement so that the vehicle body may be actually lifted slightly and some of the weight thereof removed from the spring suspension. By reason of the use of the novel body engaging and steadying means overloading of the springs is positively prevented, and likewise any otherwise possible tilting of the vehicle as a whole, as the center of gravity of the load moves during a dumping operation.

Various mechanisms may be associated with the tilting platform for accomplishing the objects of the invention but a hydraulically operated mechanism is preferable since it may be conveniently controlled and may, if desired, be so designed and constructed that it will operate automatically as the platform is tilted.

The embodiment of the invention selected for illustration by way of example, and which will now be described, includes hydraulically operated means for effecting both the tilting of the platform and the movements of the vehicle body supporting means.

In the drawings:

Figure 1 illustrates in side elevation the tiltable vehicle supporting platform disposed in horizontal position, a motor vehicle of the cargo type being shown thereon, the mechanism for effecting the tilting and for supporting the vehicle body rear end being rather diagrammatically illustrated;

Figure 2 is a generally similar view showing the platform in tilted position, the vehicle being inclined at such angle that discharge of its load is assured;

Figure 3 shows in elevation a portion of the rear end of the vehicle shown in Figures 1 and 2 together with portions of the vehicle supporting platform and the means for supporting the vehicle body during the dumping operation; and Figure 4 is a section on line 4—4 of Figure 1.

The tilting platform is generally indicated at P in the drawings and it will be understood that this platform may be constructed in various ways without departure from the invention. Preferably it will be fabricated of metal and will include two parallel wheel supporting girders suitably connected by cross braces so as to form one rigid integral structure. The forward end of the platform normally rests upon an abutment A and the platform as a whole is mounted for rocking movement about a horizontal axis which is the axis of two aligned trunnions 10, only one of which is shown. Trunnions or pins 10 are supported, respectively, in brackets 11 mounted upon and extending upwardly from the supporting pier 12 and which enter cylindrical recesses formed in brackets 13, rigid with the platform.

For the purpose of tilting the platform P about the horizontal axis defined by the trunnions a fluid pressure operated means, positioned in advance of the pier 13, is preferably employed. Such means, for instance, includes the cylinder 15, provided with aligned trunnions 16 (only one of which is illustrated) which are rotatably mounted in bearings 17 supported upon frame members 18 so that the cylinder 15 as a whole may rock about a horizontal axis parallel to the axis about which the platform tilts. Within the cylinder is a piston 20, this piston being connected by means of piston rod 21, which extends through an aperture formed in the upper end of the cylinder, to the platform P at a point toward the front end of the platform, the upper end of piston rod 21 being connected to a horizontal cross rod 22 supported in parallel frame members 23 secured to the undersurface of platform P.

Fluid under pressure may be introduced into the cylinder 15, beneath the piston 20, and withdrawn, through a flexible conduit 24 and fluid under pressure may be introduced into or allowed to escape from the upper end of the cylinder 15 through a flexible conduit 25, conduits 24 and 25 being in turn connected to parallel conduits 26 and 27 leading to a suitable source of fluid under pressure and to a fluid storage tank. A fluid storage tank is indicated at 30, and the fluid pump at 31, fluid pump 31 being driven by a prime mover such as an electric motor 32, the output of the pump passing upwardly through conduit 33 toward the inlet port of a four-way valve V the operation of which may be manually effected by the manipulation of a valve operating handle 35.

A return line 36 connects the discharge port of the four-way valve to the upper end of the tank 30. Conduits 26 and 27 terminate, respectively, at diametrically opposed ports in the casing of the valve V. The details of the valve V are not illustrated but it will be understood that the valve is of any suitable well known construction whereby fluid under pressure which enters the valve casing from fluid line 33 may be caused to flow into either of conduits 26, 27 or 36. When conduits 33 and 36 are connected the fluid will simply be recirculated, as heretofore explained, from tank 30 through pump 31, valve V and back to the tank. Valve V may be adjusted by manipulating handle 35 so that the fluid passing through conduit 33 will, instead of returning to the tank, be directed into conduit 26, from which it will pass into the flexible tube 24 and thence into the lower end of the cylinder 15 to cause the piston to move upwardly and the platform to be tilted. During this time the upper end of cylinder 15 will be connected through flexible conduit 25, conduit 27, valve V, and conduit 36, to the storage tank 30 so that liquid above piston 20 may escape as the piston rises. To lower the platform the lower end of the cylinder 15 may be connected to the storage tank 30 and its upper end to the pump. It is believed that the operation of upwardly tilting the platform and effecting its return to horizontal position will be readily understood from the foregoing description. To cushion the impact of the forward end of the platform upon the abutment A, when the platform descends, a resilient means is provided, including spaced members 40 and 41 and intermediate helical springs 42, which springs are compressed when the member 41 is engaged by the downwardly moving platform.

As previously mentioned, the platform may be constructed in various ways but preferably includes two wheel receiving trackways each comprising parallel horizontally spaced channel members 45 and 46, with flanges extending outwardly, and a second pair of channel members 47 and 48 disposed, respectively, below the channels 45 and 46, a plate 49 positioned intermediate the upper and lower pairs of channels constituting the member which directly supports the wheels of a vehicle which is positioned on the platform. Thus in Figure 3 of the drawings the tires T and $T^1$ of the left rear wheel of the truck shown may be seen to rest upon the upper surface of the plate 49, likewise the tires $T^2$ and $T^3$ of the right truck wheel are shown to be supported upon a similar plate 49', the truck axle being indicated at $T^4$.

Means is provided for limiting the movement of the truck longitudinally of the platform by limiting movement of the tires T, $T^1$, $T^2$ and $T^3$, each such means comprising an abutment 50 rigidly mounted upon a transverse member 51 which is bolted or otherwise rigidly secured to and bridges the upper flanges of the channel members 45 and 46. The wheel abutments 50 positively prevent any vehicle positioned upon the tilting platform from rolling downwardly off of the platform when the platform is tilted.

The mechanism for engaging the rear end of the spring supported body of a vehicle mounted upon the platform and, supporting such body during an unloading operation, includes two arms 54 and 55, respectively. These arms are identical in construction, are similarly mounted and are similarly operated so that only one, with the associated operating mechanism, need be described. It is T shaped in cross section so as to have a relatively large upper surface 54a adapted to engage the undersurface 56 of a truck body such as that shown in the drawings, the undersurface 56, however, being any downwardly facing surface of a structural member of the truck which may be above arm 54. The vertical web of the supporting arm 54 is pivotally connected at its forward end to the associated wheel abutment 50, as shown in Figure 4, so that the supporting arms may be rocked about horizontal pivotal axes just above the wheel abutments, in vertical planes, in the operation of the mechanism.

To effect such rocking movement fluid pressure actuated means is provided, including a cylinder 57 pivotally mounted at 58 for rocking movement about a horizontal axis parallel to the axis H, upon a frame 59 rigidly attached to the rear end of platform P, a piston 60 within the cylinder being connected by piston rod 61 to a bracket 62 secured to the supporting arm 54. The lower end of cylinder 57 may be supplied with fluid from the fluid supply means previously described through branch conduit 64 extending upwardly from conduit 26, and the flexible conduit 65, and the upper end of the cylinder 57 is connected through conduit 66 and flexible conduit 67 with conduit 27. The flow of fluid through conduit 64 is controlled by means of a valve 68 of conventional character, the movable valve member being rigidly connected by means of the elongated arm 70 and link 71 to the tilting platform P at a point in rear of the axis about which the platform may be tilted.

Assuming valve 68 to be open it will be apparent that, when the output of the pump 31 is directed into the conduit 26 to cause the piston 20 to be elevated and the platform to be tilted, fluid under pressure will likewise pass through branch conduit 64 and flexible conduit 65 into the lower end of cylinder 57 and thus raise piston 60 and effect elevation of the associated truck body engaging arm 54. When valve V is reversed both pistons 20 and 60 will be driven downwardly, the platform P returned to horizontal position and the arm 54 lowered out of contact with the truck body. Because of the fact that the valve operating arm 70 is connected to the platform P the valve 68 will be caused to automatically close when the platform has been tilted to a predetermined angle, say an angle of 15°, so that, at a predetermined point in the upward tilting movement of the platform the flow of fluid to cylinder 57 will be interrupted and the fluid contained in the cylinder beneath the piston 60 will be trapped. Closure of valve 68 is timed to occur after the truck body supporting arms have been elevated to such extent that the truck body is slightly lifted and its springs relieved of a substantial proportion of its weight. This upward movement of the truck body supporting arms occurs long prior to the time when the platform reaches the angle at which discharge of the contents of the truck occurs so that, at the time of load discharge, the rear end of the truck is positively supported and the load may pass out of the truck without causing injury to the truck springs and without causing the truck to tilt as a whole about its rear axle due to the overbalancing of the weight of its forward end by a heavy load passing over its rear end. It is therefore unnecessary to employ any means at the forward end of the platform for holding down the forward end of the truck and the dumping operation may be effected very quickly and with a minimum of manual effort. When the platform is allowed to descend the valve 68 will of course be caused to reopen, permitting fluid to escape from beneath piston 60 and allowing the arm 54 to disengage the truck body.

It will be apparent that, when vehicles of somewhat different character are to be unloaded, specifically different types of mechanisms may be employed to effect the tilting of the vehicle and the support of its body while undergoing tilting, the invention not being limited to the specific embodiment thereof which is illustrated and described by way of example. It will be understood that the term "truck," used in the appended claims, is not a word of limitation, the apparatus described being adapted to be employed, in one form or another, in association with means for bodily tilting various types of vehicles.

Having thus described the invention, what is claimed as new and desired to be secured by Letters Patent is:

1. Truck unloading apparatus comprising a platform mounted for tilting movement about a horizontal axis, wheel engaging abutments fixed on said platform, an elongated truck body engaging element pivoted to each of said abutments, and means including a cylinder and piston mounted on said platform for rocking said elements.

2. Truck unloading apparatus comprising a platform mounted for tilting movement, a truck body engaging and supporting element, and means for actuating said element including a piston and cylinder, a conduit for leading fluid under pressure to said cylinder, a valve in said conduit, and means associated with the valve and platform for closing the valve after the platform has been tilted through a predetermined angle.

3. The combination set forth in claim 2 in which said means comprises an elongated valve operating arm and a link connecting the arm and platform.

4. In combination, a platform mounted for tilting movement about a horizontal axis, fluid pressure actuated means for tilting the platform, second fluid pressure actuated means mounted on the platform for engaging and supporting a truck body, a source of fluid under pressure, a main control valve between said source and said means, a second valve intermediate said control valve and said second means, and means connecting said second valve and platform whereby the second valve is closed when the platform has been tilted through a predetermined angle.

ARTHUR LINWOOD ADAMS.

REFERENCES CITED

The following references are of record in the file of this patent:

UNITED STATES PATENTS

| Number | Name | Date |
|---|---|---|
| 1,354,688 | Rice | Oct. 5, 1920 |
| 1,596,905 | Uklenkott | Aug. 24, 1926 |
| 1,676,072 | Brockway | July 3, 1928 |
| 2,251,435 | Anthony | Aug. 5, 1941 |
| 2,275,945 | Castilla y Ruiz | Mar. 10, 1942 |

FOREIGN PATENTS

| Number | Country | Date |
|---|---|---|
| 329,286 | Germany | Nov. 19, 1920 |